United States Patent [19]
Diec et al.

[11] Patent Number: 6,083,281
[45] Date of Patent: *Jul. 4, 2000

[54] PROCESS AND APPARATUS FOR TRACING SOFTWARE ENTITIES IN A DISTRIBUTED SYSTEM

[75] Inventors: Michael Diec, Kanata; Johnson T Kuruvila, Nepean; Rod Story, Ottawa, all of Canada

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/970,206

[22] Filed: Nov. 14, 1997

[51] Int. Cl.[7] .................................................. G06F 9/45
[52] U.S. Cl. ..................................... 717/4; 714/1
[58] Field of Search ............................. 395/704, 575, 395/183.14; 364/221; 379/268

[56] References Cited

U.S. PATENT DOCUMENTS

| | | | |
|---|---|---|---|
| 3,707,725 | 12/1972 | Dellheim | 364/221 |
| 5,255,385 | 10/1993 | Kikuchi | 714/25 |
| 5,379,427 | 1/1995 | Hiroshima | 395/704 |
| 5,471,526 | 11/1995 | Linnermark et al. | 379/268 |
| 5,754,760 | 5/1998 | Warfield | 714/38 |
| 5,838,975 | 11/1998 | Abramson et al. | 395/704 |
| 5,870,606 | 2/1999 | Lindsey | 395/704 |

OTHER PUBLICATIONS

Byun–Chung–Lee, "High–Level CHILL Debugging System in Cross–Development Environments", IEEE, 211–216, May 1998.

Yau, "An Approach to Object–Oriented Requirements Verification in Software Development for Distributed Computing Systems", IEEE, 96–102, Jul. 1994.

Dauphin–Hofmann–Lemmen–Mohr, "Simple: a universal tool box for event trace analysis", IEEE, Jan. 1996.

Chung–Wang–Lin–Kuo–Hsieh, "Tools Cooperation in an Integration Environment by Message–passing Mechanism", IEEE, 451–456, Jul. 1994.

*Primary Examiner*—Tariq R. Hafiz
*Assistant Examiner*—Hoang-Vu Antony Nguyen-Ba

[57] ABSTRACT

The invention relates to a process and apparatus for tracing software entities, more particularly a tracing tool providing tracing capabilities to entities in an application. The object-tracing tool provides software components to allow tracing the execution of an application. Tracing software entities is important for software developers to permit the quick localization of errors and hence facilitate the debugging process. It is also useful for the software user who wishes to view the control flow and perhaps add some modifications to the software. Traditionally, software-tracing tools have been confined to single node systems where all the components of an application run on a single machine. The novel tracing tool presented in this application provides a method and an apparatus for tracing software entities in a distributed computing environment. This is done by using a network management entity to keep track of the location of the entities in the system and by using a library of modules that can be inherited to provide tracing capabilities. It also uses a log file to allow the program developer or user to examine the flow, the occurrence of events during a trace and the values of designated attributes. The invention also provides a computer readable storage medium containing a program element to direct a processor of a computer to implement the software tracing process.

29 Claims, 9 Drawing Sheets

PROCESS AND APPARATUS FOR TRACING SOFTWARE ENTITIES IN A DISTRIBUTED SYSTEM

FIELD OF THE INVENTION

This invention relates to a process and apparatus for tracing entities operating in a computer system for the purpose of software debugging. It is applicable to software applications and may be used to help identify the source of errors during the development and testing phase as well as to verify the activities of various entities in the system during execution. Furthermore, it may also be used for problem diagnosis in the field as well as the verification of the control flow in software systems.

BACKGROUND

From the standard microwave oven to the sophisticated database retrieval system, software is being developed at an increasingly rapid rate and the revenues generated from it are exponentially increasing. The software development process, however, does not come cheaply. Software companies spend considerable funds in research and development (R&D) for the conception and implementation of software. Software systems developed by such companies may range from control software, such as the microwave controller or telephone system, to application software, such as spreadsheets or word processors. The maintenance of such systems has also proven to be quite costly.

With this kind of economic investment, techniques are needed to improve the software development process such as to be able to produce reliable software in a more time efficient manner. In particular, tools are needed to allow software developers to trace through the execution of portions of their application and monitor the control flow and the state of different modules in a software system. The tools are commonly referred to as "debuggers" because they permits the software developer to eliminate bugs, which are errors in a software program, from their code.

In a typical debugger system, the user initiates the debugging process by invoking the debugger with the entity he wishes to trace. Typically, the flow of control is examined by the user, who is usually the software developer, by means of breakpoints, which are interruptions in the flow of execution, or by placing entries in a log file, which provides the value, time and sequence of execution of the entities being traced. The problem with the debuggers mentioned above is that they operate on applications running on single nodes. Essentially all the entities being traced are operating on the same node as the debugger. The majority of telecommunication applications, such as those present in telephone networks, operate in distributed computing environments where multiple nodes are involved in the execution of the program and the available debuggers do not allow tracing of entities running on distributed environments.

Thus, there exists a need in the industry to provide software-tracing techniques such as to obtain better debugger functionality particularly applicable to distributed systems.

OBJECT AND STATEMENT OF THE INVENTION

An object of this invention is to provide a computer readable storage medium containing a program element that implements a software object having a self-tracing capability.

Another object of this invention is to provide a computer readable storage medium implementing software objects with self-tracing capability, one software object being capable of issuing a message to another software object to trigger generation of tracing data.

Another object of this invention is to provide a computer readable storage medium implementing a tracer interface for generating user commands and issuing in response to the user commands tracing instructions to software objects.

Yet, another object of the invention is to provide a distributed data network implementing at least one software object that has a tracing capability.

The description of this process has been directed specifically to object oriented designs and hence uses the terminology of this field. The processes and principles described below and in the pages that follow can be applied to function-oriented designs as well without deterring from the spirit of this invention.

For the purpose of this specification the word "bug" designates an error in a software program that may or may not cause some undesired behavior.

For the purpose of this specification the expression "debugging" designates the process by which bugs are located and/or eliminated from a software program.

For the purpose of this specification the expression "external object" designates a software entity which can be accessed from multiple nodes on a distributed computing network.

For the purpose of this specification the expression "internal object" designates a software entity which can only be accessed by an entity residing on the node which created it or on which the "internal object" resides.

For the purpose of this specification the expression "tracing depth" or "depth of the trace" is used to designate the hierarchical level of tracing during the operation of a program where an object interacts with another object.

As embodied and broadly described herein, the invention provides a computer readable storage medium containing a program element implementing a software object, said software object being capable of selectively acquiring a self-tracing capability, upon acquisition of said tracing capability said software object implementing:

a message analyzer providing means for receiving a message containing a tracing instruction and for processing said tracing instruction to generate tracing data, the tracing data being indicative of events occurring during execution of a certain function by said software object; and a message loader for outputting a message containing the tracing data, the tracing data being recordable in a logfile.

In a most preferred embodiment of this invention, an object tracing system is provided that is integrated into a distributed software computing environment, such as one that could be used in a telephone network, which enables the user to trace through the execution of his program by using commands from a computer terminal. It allows the designer/developer to trace activities occurring on either single objects or chains of objects. In order for the system to operate on a distributed environment, the objects being traced are accessible from anywhere in the distributed system. Objects accessible anywhere in the distributed environment will be referred to herein as external objects. The most preferred embodiment of this invention uses CORBA objects (Common Object Request Broker Architecture).

CORBA objects are part of a standard defined by the Object Management Group (OMG) and are accessible anywhere in a distributed system as long as their object reference is exported. In contrast to the external objects, internal objects are only accessible within the node that created them. Preferably multiple threads of execution are used to perform the tracing operations. For a basic description of threads and distributed programming the reader may want to consult William Stallings' "Operating Systems", published by Prentice Hall. The content of this document is hereby incorporated by reference.

In a possible embodiment of this invention, the tracing tool is used to trace a single object. Once the object tracing system receives a tracing request from the user, it will first locate the entity to be traced in the distributed network using the service supplied by a Name Database. Once the node where the entity to be traced is known, the object tracing system will first issue a message to a pre-dispatcher in a communication interface that resides on the node supporting the entity to be traced. The pre-dispatcher identifies which object the message is for and sends it to that object, which is herein referred to as Object ONE. After the analyzer of Object ONE has analyzed the information contained in the message, the tracing mode of Object ONE along with the log file identifier and the tracing level are examined and set as the effective tracing parameters. Following this, a log entry (tracing data) is generated and sent to the Log File Manager, which in turn communicates with the appropriate log file to generate an entry. Control is then transferred in the communication interface from the pre-dispatcher to the dispatcher. The dispatcher looks up the method requested by the message and hands over the message to the method for processing. Control is then handed over to the post-dispatcher which performs some final housekeeping operations.

In another embodiment of this invention, the tracing tool is used to trace a chain of objects. Once the object tracing system receives a tracing request from the user, it will first locate the entity to be traced in the distributed network using the service supplied by the Name Database. Once the node where the entity to be traced is known, the object tracing system will first issue a message to the pre-dispatcher in the communication interface to initiate the trace. The pre-dispatcher identifies which object the message is for and sends it to that object, which is herein referred to as Object ONE. The analyzer of Object ONE analyzes the tracing information contained in the message. In this case the tracing information will indicate that the chain tracing is on and the depth of the trace desired by the user. The depth is then decremented by one since one more level has been traced at Object ONE. The effective tracing parameters are set to the logfile identifier, the tracing mode and the new depth (old_depth-1) received in the incoming message. Following this, a log entry is generated and sent to the Log File Manager, which in turn communicates with the appropriate log file to generate and entry. Control is then transferred in the communication interface from the pre-dispatcher to the dispatcher. The dispatcher looks up the method requested by the message and hands over the message to the method for processing. If during processing a message needs to be sent to another object, say Object TWO, before sending the message the loader module adds the effective tracing parameters to the message. Tracing parameters are only added to the message if the tracing depth is greater than 0. Control is then handed over to the post-dispatcher which performs some final housekeeping operations. When OBJECT TWO receives the message, it proceeds in a similar fashion in analyzing and processing the message.

As embodied and broadly described herein the invention also provides a computer readable storage medium containing a program element implementing:

a) a first software object, said software object being capable of selectively acquiring a self-tracing capability, upon acquisition of said self-tracing capability said software object implementing:
  a message analyzer providing means for receiving a message containing a tracing instruction and for processing the tracing instruction to generate tracing data, the tracing data being indicative of events occurring during execution of a certain function by said first software object; and
  a message loader for outputting a message containing the tracing data, said tracing data being recordable in a logfile, the message further including a logfile address to direct the message containing the tracing data to a certain logfile;

b) a second software object, said second software object being capable of selectively acquiring a self-tracing capability, upon acquisition of said self-tracing capability said second software object implementing:
  a message analyzer providing means for receiving a message containing a tracing instruction and for processing the tracing instruction to generate tracing data, the tracing data being indicative of events occurring during execution a certain function by said second software object; and
  a message loader for outputting a message containing the tracing data, the tracing data being recordable in a logfile, the message further including a logfile address to direct the message containing the tracing data to a certain logfile, the logfile addresses generated in the messages outputted by the message loaders of said first and second software objects pointing toward a common logfile, whereby permitting recordal of the tracing data from said first software object and recordal of the tracing data of the second software object in the common logfile.

As embodied and broadly described herein the invention also provides a computer readable storage medium containing a program element implementing a tracer interface for use in a distributed computer system including a plurality of nodes remote from one another, each node supporting at least one software object capable of executing a certain function, said tracer interface implementing the following functional entities:

means for receiving a user command to institute a tracing function on a certain software object;
a database containing a list of addresses associated with software objects residing in the distributed computer system;
means for searching said database to extract an address associated with the certain software object;
means for generating a message containing:
  a tracing instruction to command the certain software object to initiate a tracing function;
  data indicative of the address extracted by said means for searching said database to allow delivery of said message to the certain software object.

As embodied and broadly described herein the invention also provides a computer readable storage medium containing a program element implementing a first software object and a second software object, each software object being capable of a self-tracing capability, a) said first software object implementing:
   a message analyzer providing means for receiving a message containing a primary tracing instruction and for processing the primary tracing instruction to generate tracing data, the tracing data being indicative of events occurring during execution of a certain function by said first software object; and
   a message loader for outputting a message containing a secondary tracing instruction addressed to said second software object,
b) said second software object implementing:
   a message analyzer providing means for receiving the message containing the secondary tracing instruction and for processing the secondary tracing instruction to generate tracing data, the tracing data being indicative of events occurring during execution a certain function by said second software object.

As embodied and broadly described herein the invention further provides a distributed data network comprising:
   a first and second nodes connected to one another by a data transmission pathway;
   said first node implementing a tracer interface, said tracer interface being responsive to a user input to generate a message containing a tracer instruction;
   said second node implementing a first software object having a self-tracing capability, said first software object being responsive to the message containing the tracer instruction to generate tracing data, said tracing data being indicative of events occurring during execution a certain function by said first software object.

As embodied and broadly described herein the invention also provides a method for generating tracing data in a computer system, comprising the steps of:
   generating a tracing instruction;
   transmitting said tracing instruction to a software object;
   processing said tracing instruction at said software object to generate tracing data.

BRIEF DESCRIPTION OF THE DRAWINGS

These and other features of the present invention will become apparent from the following detailed description considered in connection with the accompanying drawings. It is to be understood, however, that the drawings are designed for purposes of illustration only and not as a definition of the limits of the invention for which reference should be made to the appending claims.

DESCRIPTION OF A PREFERRED EMBODIMENT

In this specification, the nomenclature used in object oriented programming has been employed. Expressions such as "message passing", "class", "object", "inheritance", "encapsulation" are well-known in the art of object oriented software design (OOD). For the reader who wishes to consult a reference on the topic of object oriented design, "The Object Concept, an introduction to computer programming using C++" by Rick Decker & Stuart Hirsfield PWS publishing Company, Toronto 1995, presents the basics of OOD. Also, for a basic description of threads and distributed programming the reader may want to consult William Stallings' "Operating Systems", published by Prentice Hall. The content of these documents is hereby incorporated by reference.

The present invention is concerned with processes and devices to provide tracing capabilities at the software level in distributed networks implementing software entities. In the case of object oriented design, this involves providing classes which supply the object with tracing capabilities as well as providing a software architecture to coordinate the tracing process.

Figure 1A:
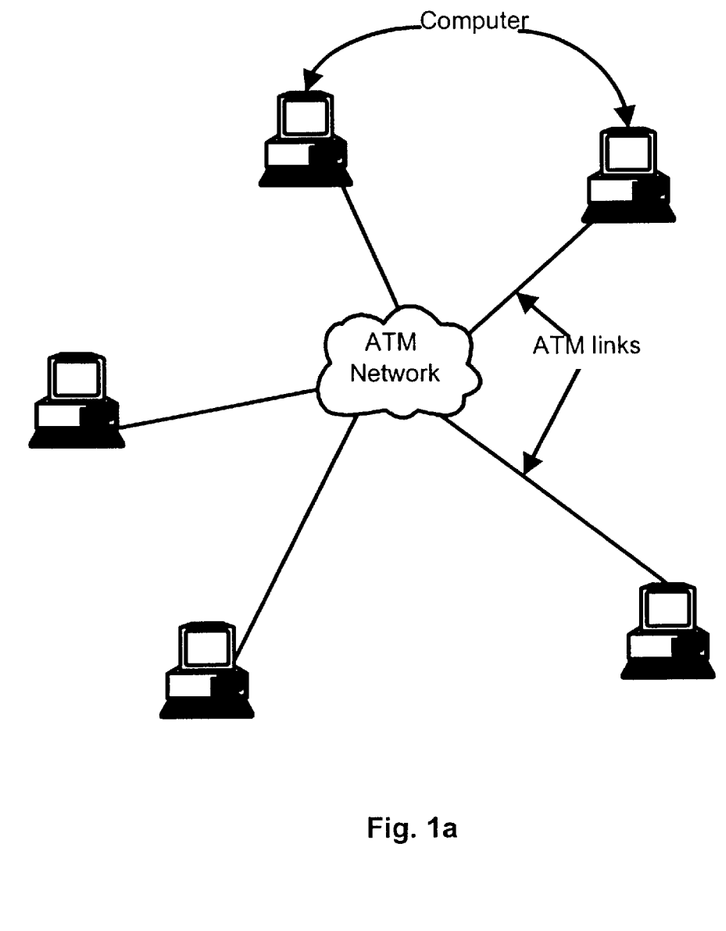
FIG. 1a shows a distributed computing network where the process in accordance with this invention can be implemented.

The systems on which the software applications, which can make use of the software tracing process in accordance with this invention, may be a single discrete computing apparatus or be of a distributed nature. In a distributed system, as shown in FIG. 1a, different parts of an application run on different computing machines that are interconnected to form a network. These machines, herein designated as nodes, may reside in geographically remote locations, and communicate using a set of predefined protocols. Protocols such as TCP/IP, client/server architecture and message passing are all possible methods of achieving a distributed computing environment. In addition to these communication protocols a standard communication interface is used, such as those defined by the Object Management Group (OMG,) to allow access to the various objects in the system. For more information on distributed processing, the reader is invited to consult Operating Systems by William Stallings, Prentice Hall $2^{nd}$ edition 1995 whose content is hereby incorporated by reference. The preferred embodiment of this invention uses the C++ programming language with a CORBA (Common Object Request Broker Architecture) interface. Other programming languages may be used in the context of the present invention and the use of such a language does not deter from the spirit of this invention.

Figure 1B:
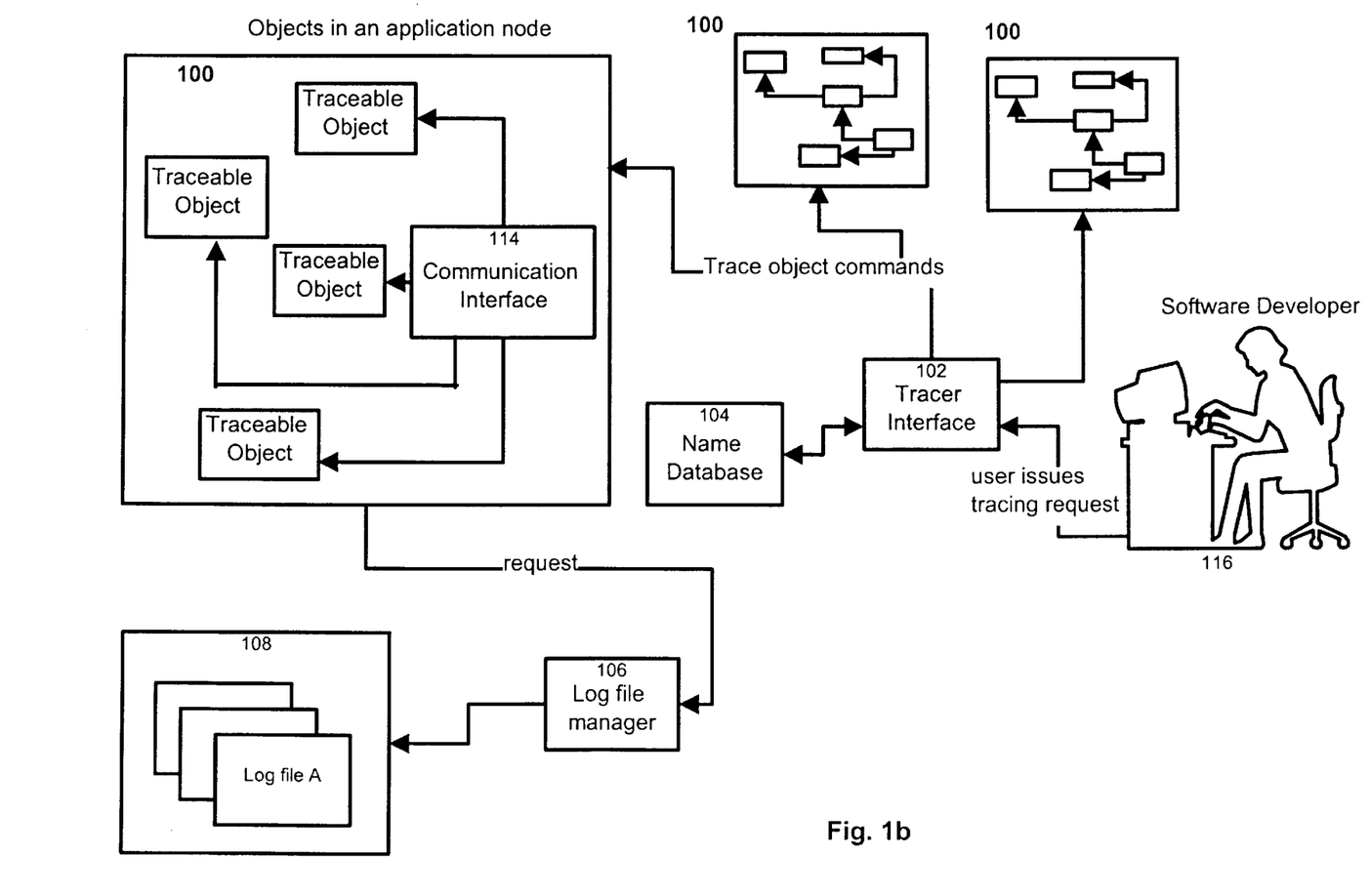
FIG. 1b shows the components of a tracing system in accordance with the invention.

In the preferred embodiment of this invention, objects become traceable by inheriting a Traceable Object class. These Traceable Objects operate in an environment, shown in FIG. 1b, that includes other entities, namely: a Tracer Interface 102, a Name Database 104, a Communication Interface 114, a Log File Manager 106 and Log Files 108. All these entities reside on computers or nodes 100 that are interconnected in such a way that they are able to communicate using a given protocol. The functions provided by each of these components and their interaction will become apparent following the explanations in the sections that follow.

Figure 2:
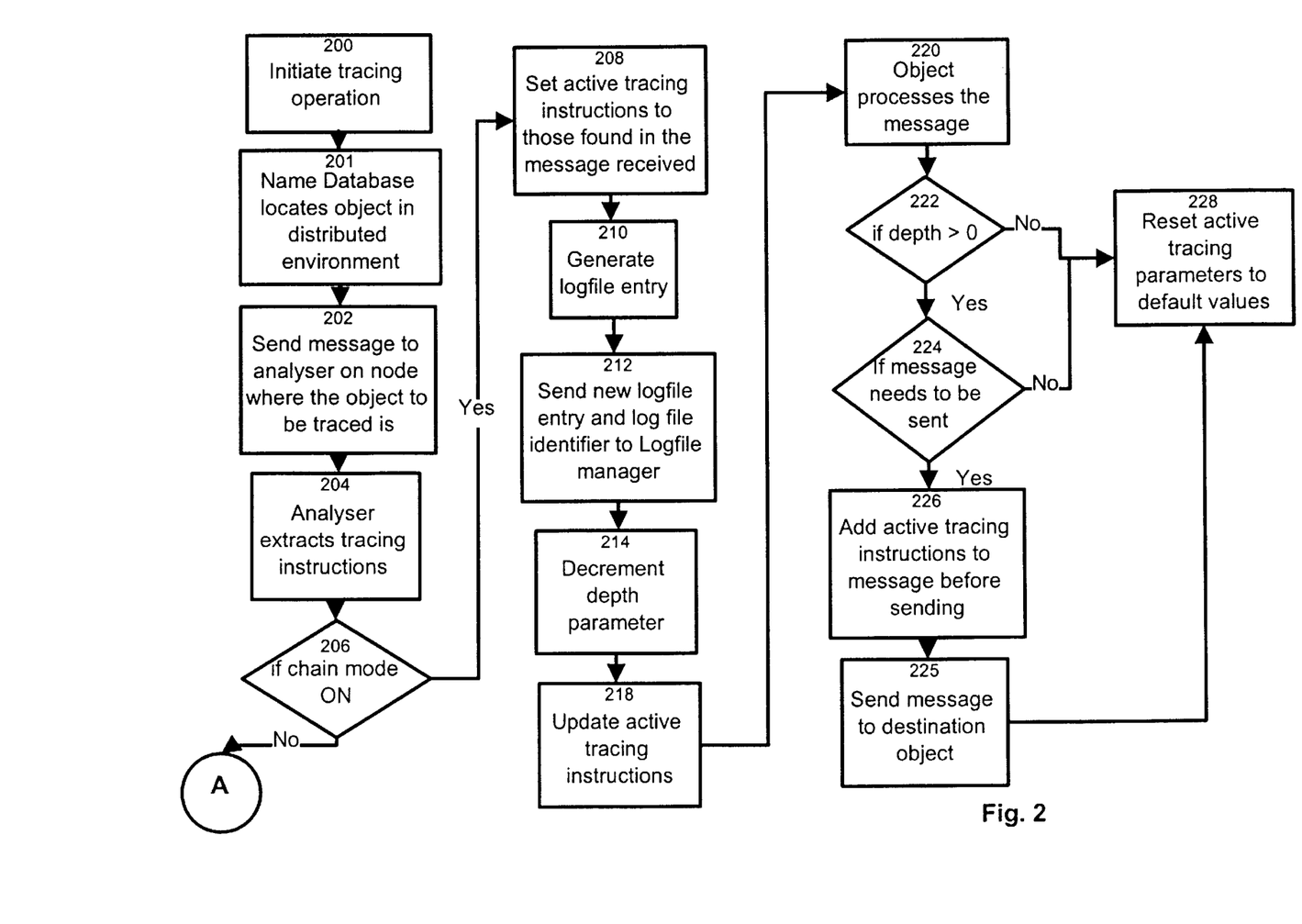
FIGS. 2, 3 and 4 are flowcharts illustrating the tracing process in accordance with an embodiment of this invention.

In the preferred embodiment, as shown in FIG. 2, when a tracing operation is first initiated 200 by the user, the Tracer Interface communicates with the Name database to locate the node 201 on which the object to be traced is situated. Once the node is located, the Communication Interface pre-dispatcher module at the node receives and forwards the message to the object 202 to be traced. The Analyzer module of the object extracts 204 from the incoming message information relating to the type of tracing to be performed and makes a decision on the next step to take in order to generate a logfile entry. As a concrete example, a data structure containing a tracing instruction field comprising the active tracing mode, the depth and the active logfile can be used and appended to the message. This information is extracted using a pre-defined protocol and a decision is made 206 based on the instruction data present. If chain tracing is ON 208, the active tracing instructions are set to those found in the tracing instruction field in the received message. This is done mainly so that during the chain trace all the logfile entries are entered in the same logfile and so that the search is consistent with what the user requires in terms of tracing depth. The Analyzer then generates a logfile entry 210 that it sends to the Logfile Manager 212 along with the active logfile identifier. In the preferred embodiment, the log entries include many items, namely: a user identifier, a logging time, the node name, the object identifier, thread information, process information, and any other user requested information. The depth parameter is then decremented by one 214 since at this object one less level needs to be traced. Following this the Loader module in the object replaces the active tracing instructions found in the incoming message by a new set of active tracing instructions 218. Namely it replaces the old depth of the tracing by the newly computed tracing depth. These new tracing instructions will be used later on in the process. The Object then processes the message 220, which means that it executes the requested operation. If the depth of the trace is greater than zero (0) 222 and if during execution messages must be sent to other objects 224, the new active tracing instructions are added to the message 226 and sent along with it 225. Once the execution is complete and all the messages have been sent, the Reset device 228 reinitializes the active tracing instructions to a default value.

Figure 3:
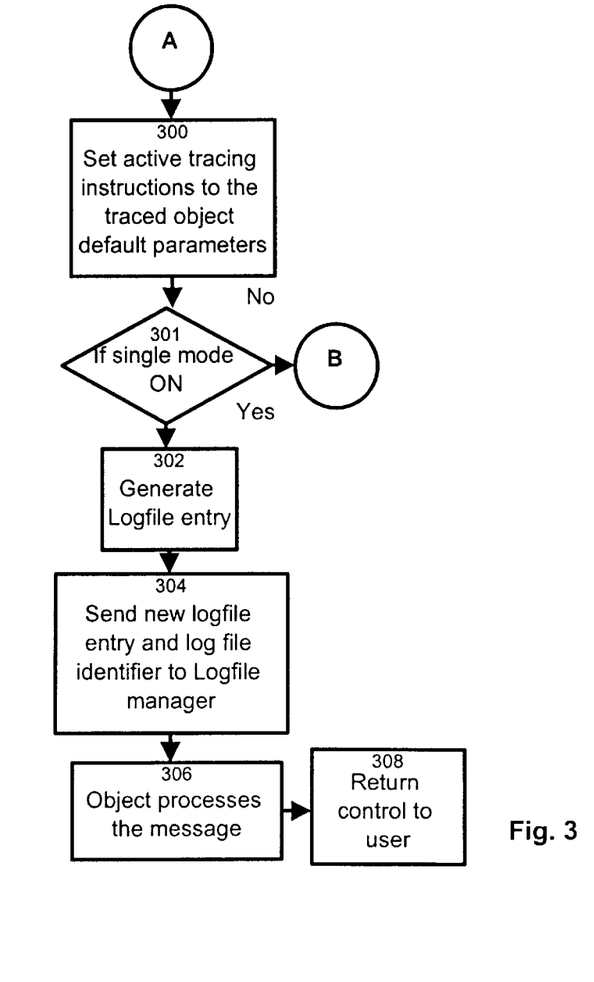
Figure 4:
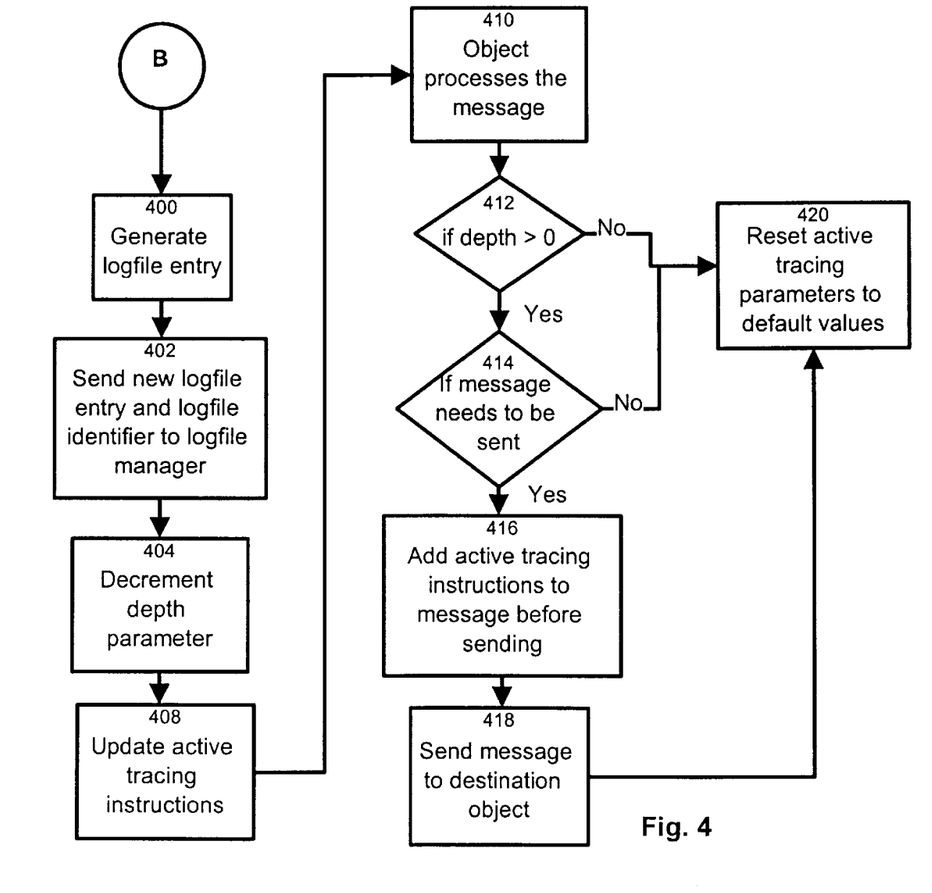

In the case where the trace mode is set to single by the tracing interface, condition 206 is answered in the negative and a different approach is taken as shown in FIG. 3. The object's default tracing parameters are used 300 and the active tracing instructions are set to these default tracing parameters. These parameters are stored in the Basic Parameter component in the object being traced. Therefore the tracing mode (chain/single), the logfile and the tracing depth are determined by the object's parameters. If the tracing mode of the object is single mode 301, the Tracing Analyzer generates a logfile entry 302 and sends it with the logfile identifier to the Logfile Manager 304. The Object then processes the message 306, which means that it executes the requested operation. If any message must be sent as a result of the execution, either it is not sent or it is sent with the tracing deactivated. Once the execution is complete, control is returned to the user 308. If the default tracing mode of the object is chain mode then condition 301 is answered in then negative and the operations are shown in FIG. 4. A logfile entry is generated 400 and sent to the Logfile Manager 402 by the Analyzer along with the default logfile identifier. Following this the depth of the trace is decremented 404 and the Loader generates the new tracing instructions 408. The incoming message is then processed by the object 410. As previously, if the tracing depth is larger than zero (0) 412 and if any messages result from this processing 414, the new tracing instructions are sent 416 along with the messages 418. The Reset device then reinitializes the active tracing instructions to their default value 420. In the case where any one of the essential parameters such as the tracing mode, depth or other is missing from the tracing instructions of the incoming message, the default values of the object are used. Other conventions may be used here and conventions differing from the ones described above do not deter from the spirit of the invention.

Description of Components

Figure 7:
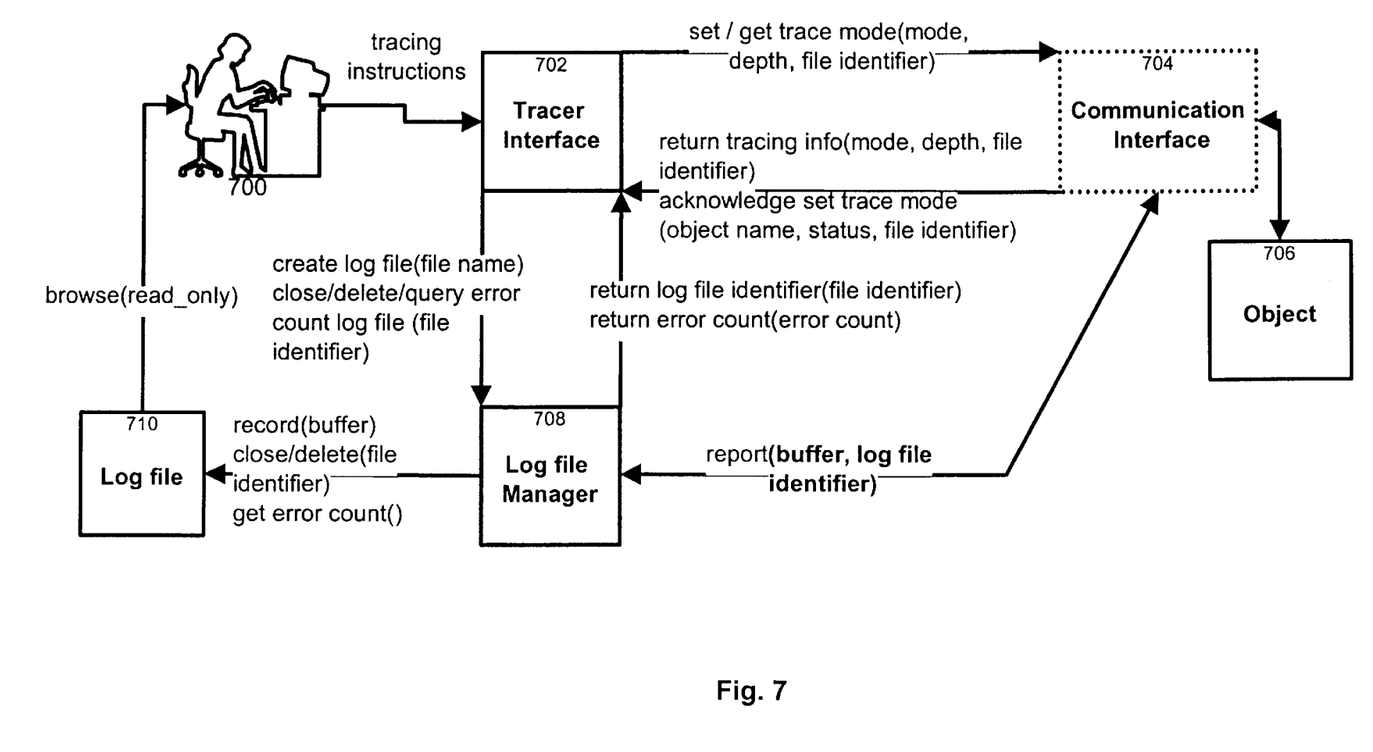
FIG. 7 shows a communication diagram of the tracing system illustrating the main components in accordance with an embodiment of the invention.

The following sections describe the different components involved in the tracing process. These components communicate with each other by sending messages that trigger operations to be performed. A sample communication diagram is shown in FIG. 7 for the main components of the system. As shown, the user 700 sends tracing instructions to the Tracing Interface 702. The user 700 can also look at the Log files 710 in "read only" mode. The Tracing Interface 702 communicates with the Log File Manager 708 in order to issue commands to manipulate the Log files 710. The Tracing Interface 702 also communicates with the Objects being traced 706 through the communication interface 704 of the latter. These components are described in the sections that follow.

The Traceable Object Class

The Traceable Object class is inherited by all the objects for which tracing is required. Preferably, if the software system includes a base class that all the objects in the application inherit, the Traceable Object class is inherited by this base class such that all the objects in the application have tracing capabilities. Inheritance is a fundamental concept in Object Oriented programming which allows objects to acquire the properties of other objects which may be either be programmed by the application programmer or can be found as standard off-the shelf components in the form of class libraries. This allows the use of tested code in new applications with no or with minimal adaptation and has for effect the reduction of the cost of software development. It also allows adding features to existing code with little or no change to the latter. The concept of inheritance is described in basic terms in "Software Engineering" by Ian Sommerville, fifth edition by Addison-Wesley publication, 1995 whose contents are hereby incorporated by reference.

Figure 8:
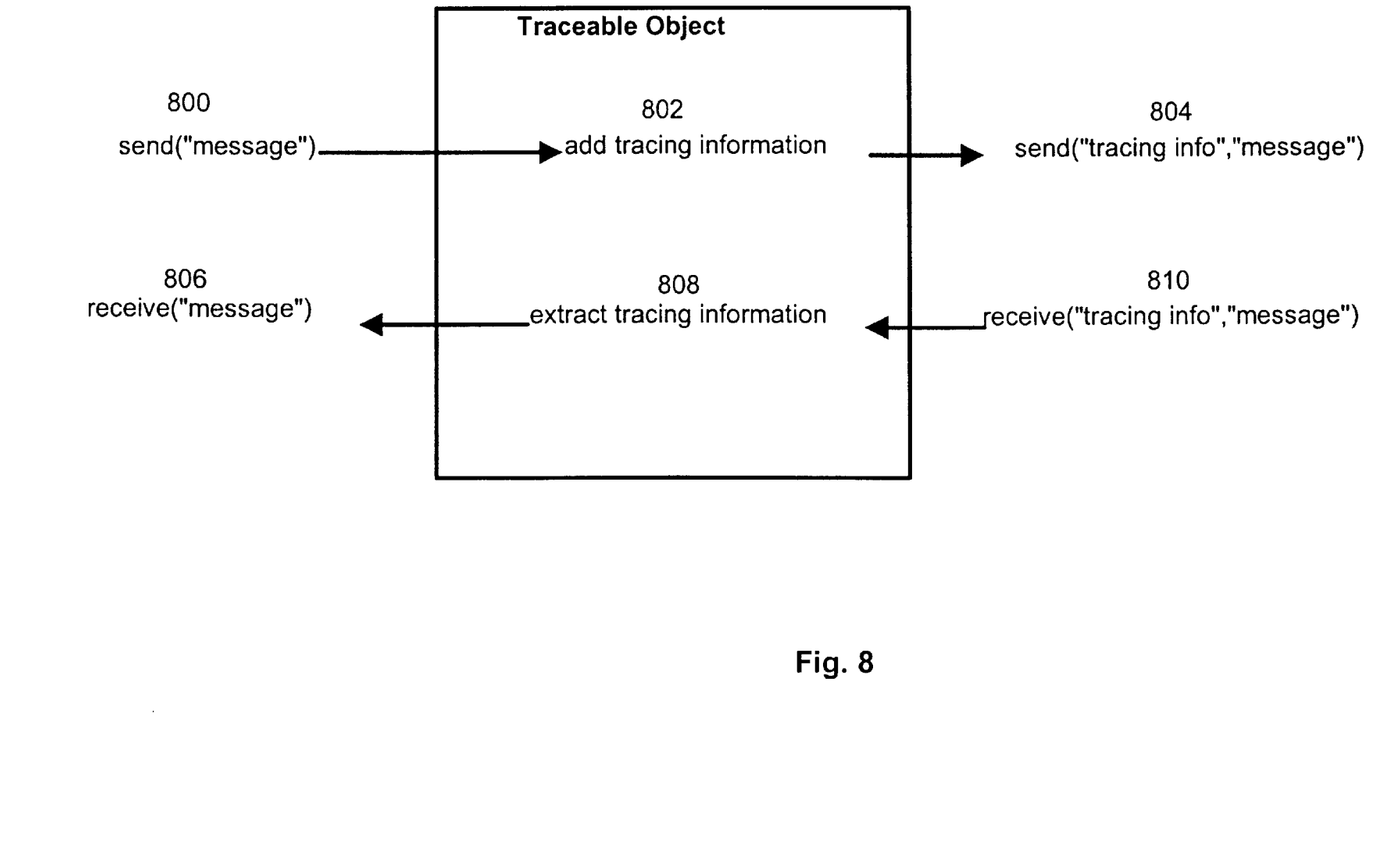
FIG. 8 shows the addition and extraction of the tracing information field from an outgoing and incoming message.

As shown in FIG. 8, the Traceable object class acts as a filter for the objects which inherit it by adding or extracting information depending on the direction of the message. In the case where a message must be sent out, the "message" 800 is generated. It is then passed through the Traceable object which adds on some tracing information 802. The message comprising both the tracing information and the original message is then sent out to its destination 804. In the case where a message must be received 810, the Traceable object extracts the tracing information 808 from the incoming message. The message 806 without the tracing information is then received.

Figure 5:
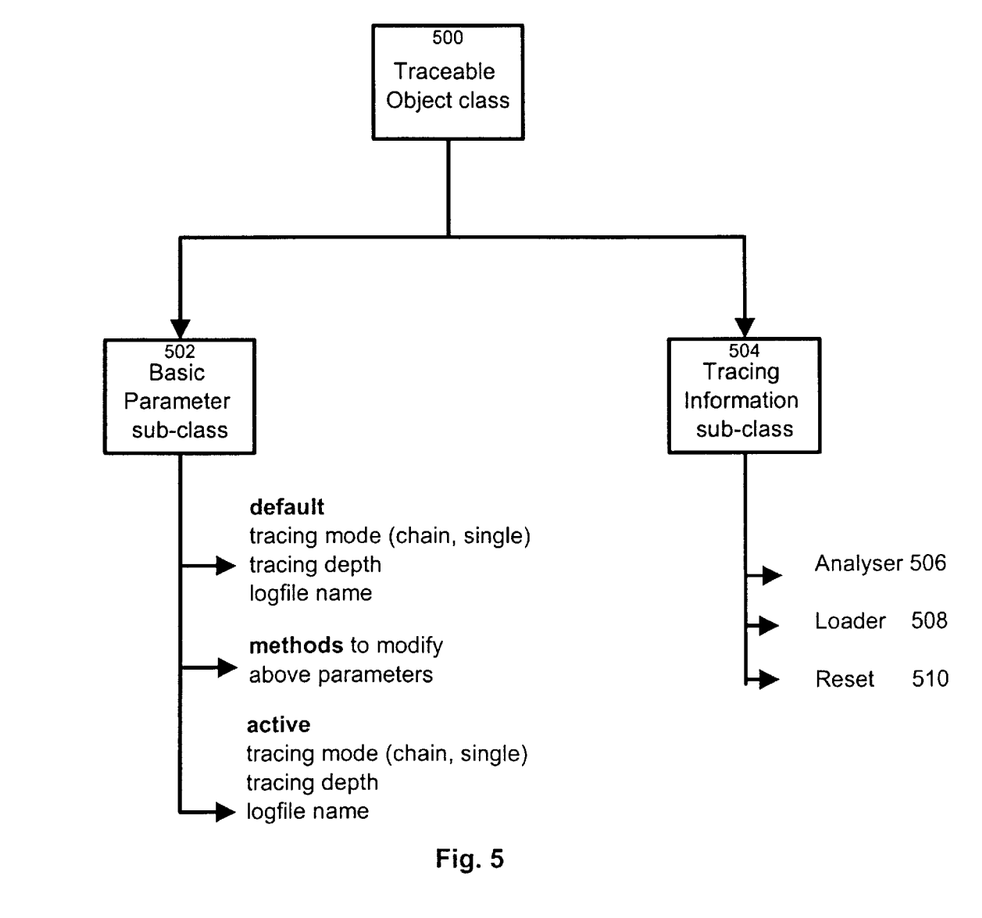
FIG. 5 shows a hierarchy diagram for the Traceable Object class.
Figure 6:
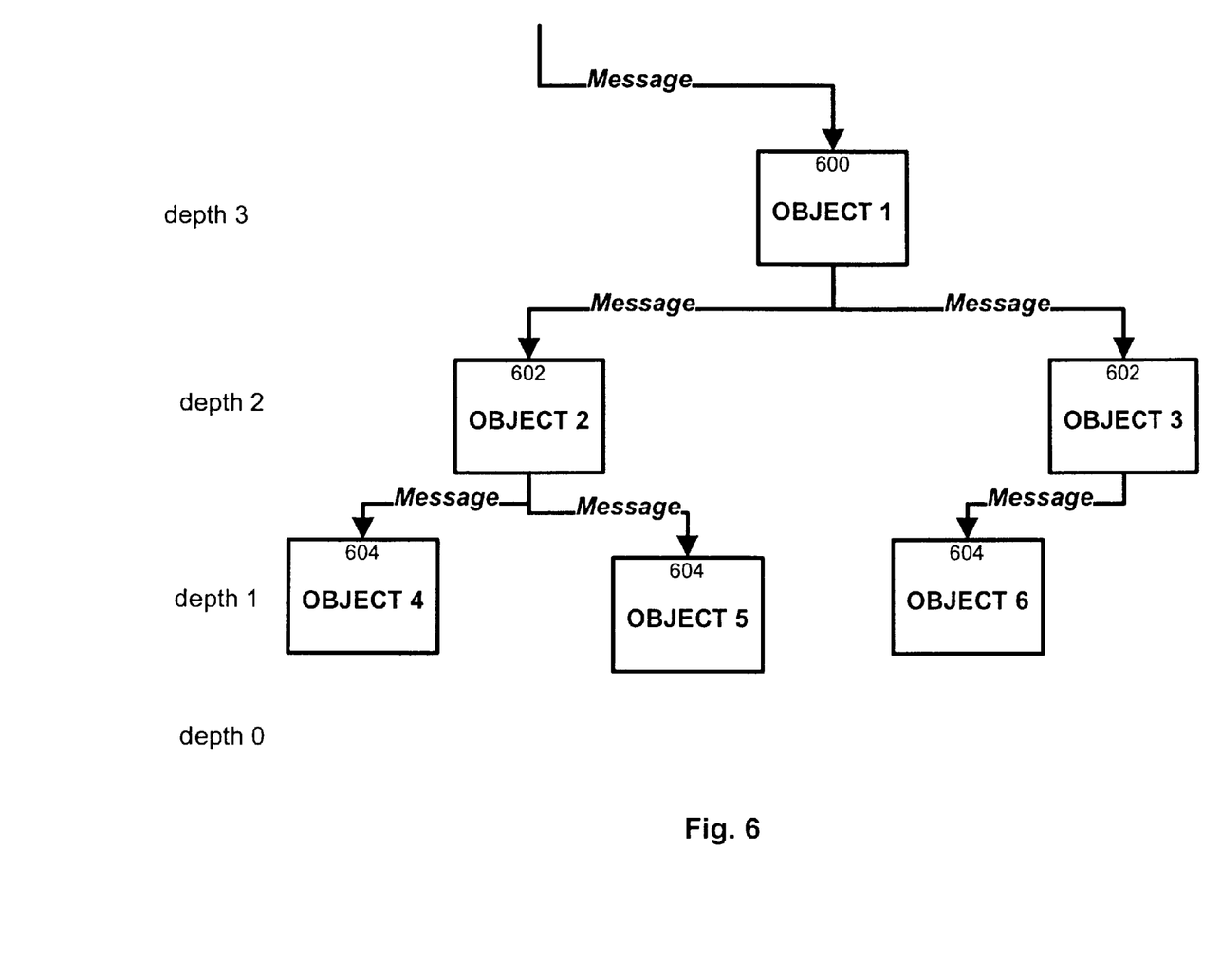
FIG. 6 shows the propagation of messages during a tracing operation with a depth of three.

As illustrated in FIG. 5, the Traceable Object class 500 is composed of two functionally distinctive subclasses namely a Basic Parameter class 502 and a Tracing Information class 504. The Basic Parameter class 502 provides a means for storing default tracing parameters such as tracing mode, tracing depth and the associated logfile for a given entity as well as functions to access and modify these parameters. Preferably, there are at least two tracing modes available for the tracing herein designated as single and chain tracing. The user is permitted to select the tracing mode he favors when he initiates the trace. Single mode permits to view the effect of a message on a single object and hence permits to view through the means of a log entry the changes in the state of the object and the messages generated as a result of the message. When the tracing mode is single, the tracing procedure terminates at the object currently being evaluated. Alternatively, chain mode permits to view the control flow and the series of messages generated by a single message which in turn generate more messages which in turn generate another series of messages and so on until a desired level is reached. For example, as shown in FIG. 6, the chain mode is specified with a depth of three (3), Object 1 generates two messages, namely one for Object 2 and one for Object 3. These objects in turn generate messages. During the trace, each Object generates a log entry every time it receives a message, and messages are sent until the depth is zero. When chain mode is specified the user may set the depth of the trace or a default value may be chosen. Note that the number of messages being traced increases exponentially with the depth of the trace. Therefore the default depth should be chosen such as not to bog down the system during the trace. In addition to storing mode and depth information, the Basic Parameter class 502 stores the default logfile associated to the object. This logfile may be assigned automatically by the system using a predefined convention (e.g. object_name.logfile) or by the application/system programmer. These three parameters (trace mode, trace depth and logfile) stored in the Basic Parameter object 502 are the default values of the object that may be traced. During the actual tracing procedure other values for these parameters may be used depending on the tracing requested by the user. The values used during the tracing are designated as active tracing parameters and may be stored in the Basic Parameter object or elsewhere. The preferred embodiment of this invention stores the active parameters in the Basic parameter object.

The second class composing the Traceable Object class 500 is the Tracing Information class 504. The Tracing Information class 504 provides means for performing an analysis on the tracing instructions embedded in an incoming message, for generating logfile entries and for loading the tracing info into an outgoing message. The Tracing Information class is composed of three functionally distinctive modules which provide these services namely an Analyzer 506, a Loader 508 and a Reset module 510.

The Analyzer 506 extracts from an incoming message the portion that contains the tracing instructions. For example, all messages may be of the form: message_in("tracing instructions", "message") where "tracing instructions" contains the tracing mode, depth and logfile of the current trace. The Analyzer 506 also performs the housekeeping operation of setting the active tracing parameters as appropriate, of decrementing the tracing depth in the case of chain tracing. The Loader 508 adds the active tracing information to an outgoing message in the case of chain tracing. Finally the reset module resets the active tracing parameters to the default tracing parameters once the tracing is complete.

The Logfile Manager

The Logfile Manager provides functions for the creation and management of Logfile objects. It also provides methods to access Logfile objects in a controlled manner. There is a unique Logfile manager in the distributed computing environment situated at a well-known location in the distributed system and that can be accessed from anywhere in the system. The Logfile Manager keeps a list of identifiers of all the tracing Logfiles in the system. It provides a transparent interface by hiding the underlying functioning of the file system. It receives messages of the type enter_log("log entry", logfile identifier) and proceeds in channeling the entry into the logfile corresponding to the logfile identifier. It also provides a controlled access to the logfiles such as to avoid concurrency problems. Concurrency problems may occur when two processes/objects attempts to access simultaneously a file and when at least one of them is attempting to write to that file. This problem may be solved by means of a semaphore or other concurrency avoidance process. Semaphores are well known in the field to which this invention pertains and is described in William Stallings' "Operating Systems", published by Prentice Hall. The content of this document is hereby incorporated by reference. In the preferred embodiment, the Logfile Manager contains a list of logfile identifiers that have not yet been assigned as well as a record of each logfile identifier currently being used. Services provided by the Logfile Manager comprise the creation, deletion and editing of the logfiles.

The Logfiles

The Logfile objects provide a means to store log entries for future observation. The standard file system provided by the operating system on which the application runs can be used provided that each file is assigned a unique identifier. The entries made to the logfile may have many forms depending on what the user wishes to trace. In the preferred embodiment, the log entries include many items, namely: a user identifier, a logging time, the node name, the object identifier, thread information, process information, and any other user requested information. The files are stored in a way that allows the user of the tracing system to browse in order to observe the entries made by the system. The particular format of the logfile is not an essential feature of this invention. The user may examine the content of a logfile through the intermediary of the Log file Manager or by using a standard text editor.

The Name Database

The Name Database is an entity which is located at a known location in the distributed system and which keeps an entry for every object in the system. The Name Database may keep track of the mode of operation of the object (active/inactive), its location in the system as well as assigns a unique identifier to each object. The exact design of the Name Database is not critical for this invention. Most preferably, the Name Database should be capable of keeping a list of all the objects with their location and other parameters. The Name Database may be queried by external entities to add an entry, modify a parameter in an entry or supply information about an entry. Typically the Name Database can be a simple lookup table.

The Tracer Interface

The Tracer Interface is the interface the user of the tracing system utilizes to perform the tracing operations. The Tracer Interface permits the user to issue messages in order to request the creation/deletion/closing of a logfile, to set the trace mode of an object being traced and to query the list of objects being traced. It also interfaces with the Logfile Manager to access instances of the Logfile class and examine their contents. When the user of the Tracing system first sends a request, the Trace Interface first verifies if the request is valid. As a concrete example, the user may request the creation of a logfile. This request is valid if there is no open file associated with user. Alternatively, a user may want more than a single logfile and so the validation may involve verifying that there is no file with the same name associated with the user. After the request has been validated, the Tracer Interface locates the entity for which the request is destined via the Naming Database using any suitable search function. Following this, the request it is sent to the proper entity for processing. Preferably, an instance of Tracer Interface class is present at each node of the distributed environment where a user is using the tracing services. If the nodes in the environment are servers where multiple users can access, an instance of the class is present for each user of the Tracing system to who it assigns a identifier. Most preferably, the Trace Interface keeps a list of the objects being traced in an internal data structure such as a linked list.

The Communication Interface

The Communication Interface module provides a mechanism to determine details about the incoming message such as the method name, the class name and the sender name from an incoming message in order to permit the generation of a log entry. Preferably, each node in the distributed system has an instance of the communication interface and all messages sent to a module in a given node are routed via this communication interface. In the present embodiment, the communication interface includes three functionally distinctive modules namely a pre-dispatcher, a dispatcher and a post-dispatcher. Alternatively, the communication interface can be embedded in the operating system or in the object themselves.

The pre-dispatcher module allows the system to receive and propagate multiple messages from or to the appropriate entity. Hence, when a message is sent to a specific object, the pre-dispatcher at the node where the object is located receives the message, determines for which object it is destined and propagates to it. A dispatcher is active when a method must be executed. Its essential role is to look up the appropriate method to be executed and send a message to the object in order to activate the method. Finally the post-dispatcher simply performs some housekeeping operations such as resetting parameters, flushing message buffers and soon.

Although the present invention has been described in considerable detail with reference to certain preferred versions thereof, other versions are possible. Therefore, the spirit and scope of the appended claims should not be limited to the description of the preferred versions contained herein.

I claim:

1. A computer readable storage medium containing a program element implementing a software object, said software object having self-tracing capability, said software object being characterized in that:
    a) said self-tracing capability is acquired by said software object by inheritance;
    b) said software object having a traceable object class allowing said software object to manifest said self-tracing capability, said traceable object class including a parameter subclass, said parameter sub-class providing means for storing tracing parameters;
    c) upon acquisition of said self-tracing capability, said software object implementing:
        a message analyzer for receiving a message containing a tracing instruction and for processing said tracing instruction to generate tracing data, the tracing data being indicative of events occurring during execution of a certain function by said software object; and
        a message loader for outputting a message containing the tracing data, the tracing data being recordable in a logfile.

2. A computer readable storage medium as defined in claim 1, wherein at least one of said message analyzer and said message loader operates in dependence of said tracing parameters.

3. A computer readable storage medium as defined in claim 2, wherein said tracing parameter s include a first parameter capable of being selectively set in either one of a single mode and a chain mode, in said chain mode said first parameter causing said message loader, upon reception by said analyzer of a message containing a tracing instruction, to generate a message containing a tracing instruction suitable for processing by another software object.

4. A computer readable storage medium as defined in claim 3, wherein when said first parameter is set in said single mode said message loader being precluded from issuing a message containing a tracing instruction suitable for processing by another software object.

5. A computer readable storage medium as defined in claim 4, wherein said first parameter c an selectively acquire either one of said single mode and said chain mode in dependence of parameter data contained in the tracing instruction received by said message analyzer.

6. A computer readable storage medium as defined in claim 5, wherein said tracing parameters include a second parameter indicative of a depth of tracing.

7. A computer readable storage medium as defined in claim 6, wherein said message loader is precluded from generating a message containing the tracing data when said second parameter acquires a certain value.

8. A computer readable storage medium as defined in claim 7, wherein said message analyzer provides means for decrementing a value of said second parameter upon reception of a message containing a tracing instruction.

9. A computer readable storage medium as defined in claim 3, wherein said tracing parameters include a third parameter storing an identifier of a logfile capable of receiving the tracing data generated by said message loader.

10. A computer readable storage medium as defined in claim 1, wherein the logfile is external to said software object.

11. A computer readable storage medium as defined in claim 10, wherein the message output by the message loader containing the tracing data also includes a logfile identifier.

12. A computer readable storage medium containing a program element implementing:
    a) a first software object, said first software object having self-tracing capability, said self-tracing capability being acquired by said first software object by inheritance, said first software object having a traceable object class allowing first software object to manifest said self-tracing capability, said traceable object class including a parameter sub-class, said parameter sub-class providing means for storing tracing parameters, upon acquisition of said self-tracing capability said software object implementing:
        a message analyzer for receiving a message containing a tracing instruction and for processing the tracing instruction to generate tracing data, the tracing data being indicative of events occurring during execution of a certain function by said first software object; and
        a message loader for outputting a message containing the tracing data, said tracing data being recordable in a logfile, the message further including a logfile address to direct the message containing the tracing data to a certain logfile;
    b) a second software object, said second software object having self-tracing capability, said self-tracing capability being acquired by said second software object by inheritance, said second software object having a traceable object class allowing said second software object to manifest said self-tracing capability, said traceable object class including a parameter sub-class, said parameter sub-class providing means for storing tracing parameters, upon acquisition of said tracing capability said second software object implementing:
        a message analyzer for receiving a message containing a tracing instruction and for processing the tracing instruction to generate tracing data, the tracing data being indicative of events occurring during execution of a certain function by said second software object; and
        a message loader for outputting a message containing the tracing data, the tracing data being recordable in a logfile, the message further including a logfile address to direct the message containing the tracing data to a certain logfile, the logfile addresses generated in the messages outputted by the message loaders of said first and second software objects pointing toward a common logfile, whereby permitting recordal of the tracing data from said first software object and recordal of the tracing data of the second software object in the common logfile.

13. A computer readable storage medium containing a program element implementing a tracer interface for use on a distributed computer system including a plurality of nodes remote from one another, each node supporting at least one software object having a certain function, said tracer interface implementing the following functional entities:

means for receiving a user command to institute a tracing function on a certain software object;

a database containing a list of addresses associated with software objects residing in the distributed computer system;

means for searching said database to extract an address associated with the certain software object;

means for generating a message containing:
a tracing instruction to command the certain software object to initiate a tracing function;
data indicative of the address extracted by said means for searching said database to allow delivery of said message to the certain software object.

14. A computer readable storage medium containing a program element implementing a first software object and a second software object, each software object having self-tracing capability,
a) said first software object implementing:
a message analyzer for receiving a message containing a primary tracing instruction and for processing the primary tracing instruction to generate tracing data, the tracing data being indicative of events occurring during execution of a certain function by said first software object; and
a message loader for outputting a message containing a secondary tracing instruction addressed to said second software object, the message loader being further operative to generate another message containing the tracing data generated by the message analyzer, the tracing data being recordable in a logfile;
b) said second software object implementing:
a message analyzer for receiving the message containing the secondary tracing instruction and for processing the secondary tracing instruction to generate tracing data, the tracing data being indicative of events occurring during execution a certain function by said second software object.

15. A computer readable storage medium as defined in claim 14, wherein said second software object comprises a message loader, the message loader of said second software object generating a message containing the tracing data generated by the message analyzer of said second software object, the tracing data being recordable in a logfile.

16. A computer readable storage medium as defined in claim 15, wherein said self-tracing capability is acquired by said first and second software objects by inheritance.

17. A computer readable storage medium as defined in claim 16, wherein each software object has a traceable object class allowing a respective software object to manifest said self-tracing capability, said traceable object class including a parameter sub-class, said parameter sub-class providing means for storing tracing parameters.

18. A computer readable storage medium as defined in claim 17, wherein at least one of said message analyzer and said message loader of said first and second software objects operates in dependence of said tracing parameters.

19. A distributed data network comprising:
a set of nodes connected to one another by a data transmission pathway;
a first node implementing a tracer interface, said tracer interface being responsive to a user input to generate a message containing a tracer instruction;
a second node implementing a first software object having a self-tracing capability, said first software object being responsive to the message containing the tracer instruction to generate tracing data, said tracing data being indicative of events occurring during execution a certain function by said first software object;
a given node in said set of nodes implementing a logfile, said first software object being operative to generate a message containing the tracing data directed to said given node for writing in said logfile.

20. A distributed data network as defined in claim 19, wherein said network includes on one of said set of nodes a second software object having a self-tracing capability, said first software object having a message generating capablility for generating a message containing a tracing instruction directed to said second software object, said second software object being responsive to the message containing the tracer instruction generated by said first software object to generate tracing data indicative of events occurring during execution a certain function by said second software object.

21. A method for generating tracing data in a computer system, comprising the steps of:
generating a tracing instruction;
transmitting a message to a software object, said message comprising the tracing instruction, said tracing instruction being associated to tracing parameters, and said message further comprising said tracing parameters associated to said tracing instruction;
processing said tracing instruction at said software object to generate tracing data.

22. A method for generating tracing data as defined in claim 21, comprising the step of recording said tracing data in a logfile.

23. A method for generating tracing data as described in claim 22, comprising the step of processing said tracing parameters and generating said tracing data in dependence of said tracing parameters.

24. A method for generating tracing data as defined in claim 23, wherein said tracing parameters include a first parameter set in either one of a single mode and a chain mode, when said first tracing parameter is in said chain mode said method comprises the step of causing generation by said software object of a message containing a tracing instruction suitable for processing by another software object.

25. A method for generating tracing data as defined in claim 24, wherein when said first parameter is set in said single mode said software object being precluded from issuing a message containing a tracing instruction suitable for processing by another software object.

26. A method for generating tracing data as defined in claim 25, wherein said tracing parameters include a second parameter indicative of a depth of tracing.

27. A method for generating tracing data as defined in claim 26, said method further comprising the step of precluding the generation of a message containing the tracing data when said second parameter acquires a certain value.

28. A method for generating tracing data as defined in claim 27, comprising the step of decrementing a value of said second parameter upon reception by said software object of said message containing a tracing instruction.

29. A method for generating tracing data as defined in claim 28, wherein said tracing parameters include a third parameter storing an identifier of a logfile capable of receiving the tracing data.

* * * * *